United States Patent [19]
Shih

[11] Patent Number: 6,042,719
[45] Date of Patent: Mar. 28, 2000

[54] DEEP DESULFURIZATION OF FCC GASOLINE AT LOW TEMPERATURES TO MAXIMIZE OCTANE-BARREL VALUE

[75] Inventor: Stuart S. Shih, Cherry Hill, N.J.

[73] Assignee: Mobil Oil Corporation, Fairfax, Va.

[21] Appl. No.: 09/192,650

[22] Filed: Nov. 16, 1998

[51] Int. Cl.$^7$ .................................................. C10G 45/04
[52] U.S. Cl. .................... 208/217; 208/216 R; 208/143; 208/144
[58] Field of Search ................................. 208/251 R, 217, 208/143, 144

[56] References Cited

U.S. PATENT DOCUMENTS

| | | | |
|---|---|---|---|
| 3,668,113 | 6/1972 | Burbidge et al. | 208/97 |
| 3,673,078 | 6/1972 | Kirk, Jr. | 208/89 |
| 3,775,287 | 11/1973 | Bryson | 208/17 |
| 3,781,197 | 12/1973 | Bryson | 108/89 |
| 3,847,793 | 11/1974 | Schwartz et al. | 208/70 |
| 5,028,573 | 7/1991 | Brown et al. | 502/66 |
| 5,041,208 | 8/1991 | Partridge et al. | 208/217 |
| 5,082,984 | 1/1992 | Brown et al. | 585/481 |
| 5,318,690 | 6/1994 | Fletcher et al. | 208/89 |
| 5,348,641 | 9/1994 | Shih | 208/89 |
| 5,362,376 | 11/1994 | Shih | 208/89 |
| 5,391,288 | 2/1995 | Collins et al. | 208/89 |
| 5,399,258 | 3/1995 | Fletcher et al. | 208/89 |
| 5,409,596 | 4/1995 | Fletcher et al. | 208/89 |
| 5,456,821 | 10/1995 | Absil et al. | 208/114 |
| 5,500,108 | 3/1996 | Durand et al. | 208/89 |
| 5,520,799 | 5/1996 | Brown et al. | 208/143 |

*Primary Examiner*—Helane Myers
*Attorney, Agent, or Firm*—Penny L. Prater; Malcolm D. Keen

[57] ABSTRACT

Low sulfur gasoline of relatively high octane-barrel value is produced from cracked, sulfur containing olefinic naphthas by hydrodesulfurization at low temperature and low space velocity over either a conventional catalyst, such as CoMo/$Al_2O_3$, or a dual functional catalyst, such as CoMo ZSM-5/$Al_2O_3$. This approach also minimizes the olefins/hydrogen sulfide re-combination frequently observed at high temperature. The process produces a gasoline having a reduced sulfur content with a less than 5% change in motor octane number and a less than 10% change in research octane number.

10 Claims, No Drawings

DEEP DESULFURIZATION OF FCC GASOLINE AT LOW TEMPERATURES TO MAXIMIZE OCTANE-BARREL VALUE

BACKGROUND OF THE INVENTION

This invention relates to a process for producing a gasoline of reduced sulfur content without a loss in yield, while olefin saturation is minimized to preserve octane-barrel value. More specifically, the invention relates to low temperature process for producing a gasoline of reduced sulfur content which advantageously relies on either a dual functional catalyst, such as CoMo ZSM-5/$Al_2O_3$, or a conventional catalyst, such as CoMo/$Al_2O_3$, to maximize the octane-barrel value of the product gasoline.

Catalytically cracked gasoline currently forms a major part of the gasoline product pool in the United States and the cracking process contributes a large proportion of the sulfur in the gasoline. The sulfur impurities may require removal, usually by hydrotreating, in order to comply with product specifications or to ensure compliance with environmental regulations. Low sulfur levels result in reduced emissions of CO, $NO_x$, and hydrocarbons. In addition, other environmental controls may be expected to impose increasingly stringent limits on gasoline composition. Currently, the requirements of the U.S. Clean Air Act and the physical and compositional limitations imposed by the Reformulated Gasoline ("RFG") and EPA Complex Model regulations will result not only in a decrease in permissible sulfur levels but also in limitations on boiling range, typically measured by minimum Reid Vapor Pressure ("RVP") and $T_{90}$ specifications. Limitations on aromatic content may also arise from the Complex Model regulations.

Cracked naphtha, as it comes from the catalytic cracker and without any further treatments, such as purifying operations, has a relatively high octane number as a result of the presence of olefinic components. In some cases, this fraction may contribute as much as up to half the gasoline in the refinery pool, together with a significant contribution to product octane. Other unsaturated fractions boiling in the gasoline boiling range, which are produced in some refineries or petrochemical plants, include pyrolysis gasoline and coker naphtha. Pyrolysis gasoline is a fraction which is often produced as a by-product in the cracking of petroleum fractions to produce light unsaturates, such as ethylene and propylene. Pyrolysis gasoline has a very high octane number but is quite unstable in the absence of hydrotreating because, in addition to the desirable olefins boiling in the gasoline boiling range, it also contains a substantial proportion of diolefins, which tend to form gums after storage or standing. Coker naphtha is similar in containing significant amounts of sulfur and nitrogen as well as diolefins which make it unstable on storage.

Hydrotreating of any of the sulfur containing fractions, which boil in the gasoline boiling range, causes a reduction in the olefin content and consequently a reduction in the octane number. As the degree of desulfurization increases, the octane number of the normally liquid gasoline boiling range product decreases. Some of the hydrogen can also cause some hydrocracking as well as olefin saturation, depending on the conditions of the hydrotreating operation.

Naphthas and other light fractions such as heavy cracked gasoline can be hydrotreated by passing the feed over a hydrotreating catalyst at an elevated temperature and a somewhat elevated pressure in a hydrogen atmosphere. One suitable family of catalysts which has been widely used for this service is a combination of a Group VIII metal and a Group VI metal of the Periodic Table, such as cobalt and molybdenum, on a substrate such as alumina. After the hydrotreating operation is complete, the product can be fractionated, or simply flashed, to release the hydrogen sulfide and collect the now sweetened gasoline.

Various proposals have been made for removing sulfur while retaining the more desirable olefins. The sulfur impurities tend to concentrate in the heavy fraction of the gasoline and hydrodesulfurization processes have been employed that treat only the heavy fraction of the catalytically cracked gasoline so as to retain the octane contribution from the olefins which are found mainly in the lighter fraction. In one commercial operation, the selectivity for hydrodesulfurization relative to olefin saturation is shifted by suitable catalyst selection, for example, by the use of a magnesium oxide support instead of the more conventional alumina.

In any case, regardless of the mechanism by which it happens, the decrease in octane which takes place as a consequence of sulfur removal by hydrotreating creates a conflict between the growing need to produce gasoline fuels with higher octane number and—because of current ecological considerations—the need to produce cleaner burning, less polluting fuels, especially low sulfur fuels. This inherent conflict is yet more marked in the current supply situation for low sulfur, sweet crudes.

Aromatics are generally the source of high octane number, particularly very high research octane numbers, and are, therefore, desirable components of the gasoline pool. However, they have been the subject of severe limitations as a gasoline component because of possible adverse effects on the ecology, particularly with reference to benzene. Thus, it has become desirable, as far as is feasible, to create a gasoline pool in which the higher octanes are contributed by the olefinic and branched chain paraffinic components, rather than the aromatic components.

SUMMARY OF THE INVENTION

It has now been discovered that the problems encountered in the prior art can be overcome by the present invention, which provides a process for reducing sulfur content of gasoline while substantially maintaining the motor octane number and the research octane number. The process includes contacting a catalytically cracked olefinic gasoline stream containing organic sulfur compounds and having an initial boiling point in the gasoline boiling range, an initial sulfur content and an initial road octane number with either a conventional desulfurization catalyst or a dual functional catalyst. Preferred conventional desulfurization catalysts are made up of a Group VI and/or a Group VIII metal on a suitable substrate and dual functional catalysts are made up of an intermediate pore size zeolite having an aluminum substrate impregnated with at least one metal selected from the group consisting of Group VI metals and Group VIII metals. The gasoline stream contacts the catalyst under a combination of a temperature of from about 300 F. to about 650 F., a space velocity of from about 0.1 to 10 LHSV and an atmosphere comprising hydrogen to convert the sulfur compounds to hydrogen sulfide. The hydrogen sulfide can then be removed from the gasoline stream to provide a gasoline with a reduced sulfur content lower than the initial sulfur content. In addition, the product gasoline has a less than 5% change in the motor octane number and a less than 10% change in the research octane number.

When a dual functional catalyst is used, the intermediate pore size zeolite catalyst which is used can be selected from a group of several catalysts that includes ZSM-5, ZSM-11, ZSM-22, ZSM-12, ZSM-23, ZSM-35, ZSM-48, ZSM-57, ZSM-58, MA41S and MCM-22. In one embodiment of the present invention, the intermediate pore size zeolite is impregnated with cobalt and molybdenum. The amounts of cobalt and molybdenum can vary according to several factors, such as, the composition of the feedstock, the process operating conditions and the desired characteristics of the product gasoline. The preferred ranges, in terms of the total weight of the impregnated catalyst, are from about 0.5% to 10% by weight cobalt and from about 1% to 20% by weight molybdenum.

The process of the present invention has a kinetic ratio of the reaction rate constant for the bromine number reduction to the reaction rate constant for desulfurization of less than 0.02 for full range gasolines and less than 0.005 for 90 C- fraction of the full range gasoline, and the most preferred operating conditions have a K ratio of less than 0.01 and 0.002, respectively.

The present invention has the following operating conditions: the space velocity is from about 0.1 to 10 LHSV and preferably from about 0.5 to 5 LHSV; the ratio of hydrogen to hydrocarbon is about 100 to about 5,000 standard cubic feet of hydrogen per barrel of hydrocarbon and preferably about 500 to 2,500 standard cubic feet of hydrogen per barrel of hydrocarbon; the pressure range is from about 100 psig to about 600 psig.

In a preferred embodiment, the reduced sulfur content of the recovered gasoline stream is from about 5% to about 20% of the initial sulfur content.

The low temperature process of the present invention has several advantages over gasoline desulfurization processes known in the prior art, including high desulfurization without significant reduction of the octane-barrel value. The lower operating temperature of the present invention also provides the advantage of minimizing the olefins/hydrogen sulfide re-combination that is frequently observed in the high temperature processes of the prior art. Additionally, because the present invention is operated at a relatively low temperature, it has the advantage of preserving a high gasoline yield.

DETAILED DESCRIPTION OF THE PREFERRED EMBODIMENTS

As new gasoline regulations permit lower amounts of sulfur, an increasing amount of cracked gasoline has to be hydrofinished. This typically results in a severe octane loss. The process of the present invention provides high desulfurization and high gasoline yields by using a dual functional catalyst that both desulfurizes and cracks the olefinic naphthas. In addition, by adjusting the process parameters, the amount of olefins in the product gasoline can be tailored to meet different target specifications.

It is generally agreed that the desulfurization activity improves with temperature. This is particularly desirable for desulfurization of fluid catalytic cracking ("FCC") gasoline over a zeolite containing catalyst, which enhances the octane of the desulfurized products. However, such an approach results in a yield loss. The process disclosed in the present invention can desulfurize FCC gasoline to low sulfur content while olefin saturation is minimized to preserve octane-barrel value. Since it is operated at relatively low temperature, a high gasoline yield is preserved.

It has been found that, for the desulfurization of FCC gasoline, the rate constant ratio of olefin saturation to desulfurization increases with temperature. Consequently, operation at low temperature (i.e., less than 650 F.) and low space velocity can maximize octane-barrel value. This approach also minimizes the olefins/hydrogen sulfide re-combination frequently observed at high temperature.

The present invention can operate at surprisingly low temperatures (400–650 F. verses 675–800 F. for the typical catalytic hydrodesulfurization process) and provides higher gasoline yields than conventional hydrodesulfurization processes, especially at less than 95% desulfurization. Under the low-temperature and low liquid hourly space velocity (LHSV) operating conditions of the present invention, the olefin saturation is minimized and the octane-barrel value is preserved.

Feedstock

The feed to the process comprises a sulfur-containing petroleum fraction that boils in the gasoline boiling range, which can be regarded as extending from $C_4$ to about 500 F. although lower end points below the 500 F end point are more typical. Feeds of this type include light naphthas typically having a boiling range of about $C_4$ to 330 F., full range naphthas typically having a boiling range of about $C_4$ to 420 F., heavier naphtha fractions boiling in the range of about 260 F. to 412 F., or heavy gasoline fractions boiling at, or at least within, the range of about 330 F. to 500 F., preferably about 330 F. to 420 F. While the most preferred feed appears at this time to be a heavy gasoline produced by catalytic cracking; or a light or full range gasoline boiling range fraction, the best results are obtained when, as described below, the process is operated with a gasoline boiling range fraction which has a 95 percent point (determined according to ASTM D 86) of at least about 325 F. and preferably at least about 350 F., for example, 95 percent points ($T_{95}$) of at least 380 F. or at least about 400 F. The process can be applied to thermally cracked naphthas such as pyrolysis gasoline, coker naphtha and visbreaker naphtha as well as catalytically cracked naphthas such as thermofor catalytic cracking (TCC) or fluid catalytic cracking (FCC) naphtha since both types are usually characterized by the presence of olefinic unsaturation and the presence of sulfur. From the point of view of volume, however, the main application of the process is likely to be with catalytically cracked naphthas, especially FCC naphthas and for this reason, the process will be described with particular reference to the use of catalytically cracked naphthas.

The process can be operated with the entire gasoline fraction obtained from the catalytic cracking step or, alternatively, with part of it. Because the sulfur tends to be concentrated in the higher boiling fractions, it is preferable, particularly when unit capacity is limited or a high degree of sulfur removal is required, to separate the higher boiling fractions and process them through the steps of the present process without processing the lower boiling cut. The cut point between the treated and untreated fractions can vary according to the sulfur compounds present. A cut point in the range of from about 100 F. to about 300 F. is preferred, and a cut point in the range of about 200 F. to about 300 F. is the most preferred. The exact cut point selected will depend on the sulfur specification for the gasoline product as well as the gasoline product as well as on the type of sulfur compounds present; lower cut points will typically be necessary for lower product sulfur specifications. Sulfur which is present in components boiling below about 180 F. is mostly in the form of mercaptans, which can be removed by extractive type processes. However, hydrotreating is appropriate for the removal of thiophene and other cyclic sulfur compounds present in higher boiling components, that is, component fractions boiling above about 180 F. Treatment of the lower boiling fraction in an extractive type process coupled with hydrotreating of the higher boiling component may therefore represent a preferred economic process option. Such a variant of the process is described in Ser. No. 08/042,189, filed Mar. 30, 1993 now U.S. Pat. No. 5,360,532 and Ser. No. 07/001,681, filed Jan. 7, 1993 now U.S. Pat. No. 5,318,690. Higher cut points will be preferred in order to minimize the amount of feed which is passed to the hydrotreater and the final selection of cut point together with other process options such as the extractive type desulfurization will therefore be made in accordance with the product specifications, feed constraints and other factors.

The sulfur content of these catalytically cracked fractions will depend on the sulfur content of the feed to the cracker as well as on the boiling range of the selected fraction used as the feed in the process. Lighter fractions, for example, will tend to have lower sulfur contents than the higher boiling fractions. As a practical matter, the sulfur content will exceed 50 ppmw and, in most cases, the sulfur content will be in excess of about 500 ppmw. For the fractions which have 95 percent points over about 380 F., the sulfur content can exceed about 1,000 ppmw and can be as high as 4,000 to 5,000 ppmw, or higher. The nitrogen content is not as characteristic of the feed as the sulfur content and is preferably not greater than about 20 ppmw, although higher nitrogen levels typically up to about 70 ppmw can be found in certain higher boiling feeds with 95 percent points in excess of about 380 F. The nitrogen level will, however, usually not be greater than 250 or 300 ppmw. As a result of the cracking which precedes the steps of the present process, the feed to the hydrodesulfurization step will be olefinic, with an olefin content of at least 5% by weight and more typically in the range of 15–20 weight percent (wt %), although higher olefin levels, for example 40 wt %, or even higher, can be encountered in specific charge stocks, such as gasoline obtained from residuum catalytic cracking (RCC) processes.

Process Configuration

One embodiment of the present invention includes the use of a conventional hydrodesulfurization catalyst at low operating temperature to desulfurize olefinic gasoline while maintaining the octane-barrel value. In another embodiment, a dual functional catalyst that has a very strong desulfurization function as well as a selective cracking function is used to treat sulfur-containing, gasoline boiling range feedstock. The dual catalyst functions as a conventional hydrotreating catalyst to separate sulfur from the hydrocarbon feed and convert the sulfur to hydrogen sulfide. The dual catalyst also contains an intermediate pore size zeolite that promotes catalytic cracking.

The catalyst used for hydrodesulfurization is suitably a conventional desulfurization catalyst made up of a Group VI and/or a Group VIII metal on a suitable substrate. The Group VI metal is preferably molybdenum or tungsten and the Group VIII metal preferably nickel or cobalt. Combinations, such as Ni Mo, Co Mo and Ni Co Mo are typical, with Co Mo used in preferred embodiments. Other metals which possess hydrogenation functionality are also useful in this service. The support for the catalyst is conventionally a porous solid, usually alumina, or silica-alumina but other porous solids such as magnesia, titania or silica, either alone or mixed with alumina or silica-alumina can also be used, as convenient.

The particle size and the nature of the hydrotreating catalyst will usually be determined by the type of hydrotreating process which is being carried out, although in most cases, a down-flow, fixed bed process is preferred.

In preferred embodiments of the present invention, a dual functional catalyst formed by impregnating a zeolite having an alumina substrate with a Group VI and/or a Group VIII metal is used. This combination produces a catalyst that performs desulfurization as well as cracking functions. The hydrogenation reaction and the cracking reaction performed by the dual functional catalyst are complimentary because the hydrogenation reactions are exothermic, and result in a rise in temperature, while the cracking reactions are endothermic reactions. Therefore, the hydrotreating conditions are adjusted not only to obtain the desired degree of desulfurization but also to produce the optimum temperature for promotion of the desired shape-selective cracking reactions.

The preferred dual functional catalysts for this invention contain zeolite-type crystals and, most preferably, intermediate pore size zeolites. For purposes of this invention, the term "zeolite" is meant to represent the class of porotectosilicates, i.e., porous crystalline silicates, that contain silicon and oxygen atoms as the major components. Other components can be present in minor amounts, usually less than 14 mole %, and preferably less than 4 mole %. These components include alumina, gallium, iron, boron and the like, with aluminum being preferred, and used herein for illustrative purposes. The minor components can be present separately or in mixtures in the catalyst. They can also be present intrinsically in the structure of the catalyst.

The dual functional catalyst promotes cracking reactions that convert low octane paraffins into higher octane products, both by the selective cracking of heavy paraffins to lighter paraffins and by cracking low octane n-paraffins, in both cases with the generation of olefins. Ring-opening reactions can also take place, leading to the production of further quantities of high octane gasoline boiling range components. The dual functional catalyst also improves product octane by dehydrocyclization/aromatization of paraffins to alkylbenzenes.

The extent of the desulfurization will depend on the feed sulfur content and, of course, on the product sulfur specification with the reaction parameters selected accordingly. It is not necessary to go to very low nitrogen levels but low nitrogen levels can improve the activity of the cracking catalyst. Normally, the denitrogenation which accompanies the desulfurization will result in an acceptable organic nitrogen content. However, if it is necessary to increase the denitrogenation in order to obtain a desired level of activity in the cracking step, the operating conditions for the hydrogenation reaction can be adjusted accordingly.

The operating conditions are selected to produce a controlled degree of desulfurization. Typically, the temperature of the reactor will be about 300 F. to 650 F., and preferably about 400 F. to 600 F. The reactor pressure will typically be about from 100 to 700 psig, and preferably about 100 to 400 psig with comparable space velocities, typically from about 0.1 to 10 LHSV (hr$^{-1}$), and preferably about 0.5 to 5 LHSV (hr$^{-1}$) The present catalyst combination of molybdenum on ZSM-5 has been found to be effective at low pressures below about 250 psig and even below 200 psig. Hydrogen to hydrocarbon ratios typically of about 100 to 5,000 scf/bbl, preferably about 500 to 2,500 scf/bbl will be selected to minimize catalyst aging.

Consistent with the objective of restoring lost octane while retaining overall product volume, the conversion to products boiling below the gasoline boiling range ($C_5-$) during the cracking is held to a minimum and distillation of the gasoline feed stream is maintained below 50%. However, because the cracking of the heavier portions of the feed can lead to the production of products still within the gasoline range, the conversion to $C_5-$ products is at a low level, in fact, a net increase in the volume of $C_5+$ material can occur during this stage of the process. It is for this reason that the use of the higher boiling naphthas is favored, especially the fractions with 95 percent points above about 350 F. and even more preferably above about 380 F. or higher, for instance, above about 400 F. Normally, however, the 95 percent point ($T_{95}$) will not exceed about 520 F. and usually will be not more than about 500 F.

The acidic component of the dual functional catalyst is an intermediate pore size zeolite. Zeolites of this type are characterized by a crystalline structure having rings of ten-membered rings of oxygen atoms through which molecules obtain access to the intracrystalline pore volume. These zeolites have a Constraint Index from 2 to 12, as defined in U.S. Pat. No. 4,016,218, to which reference is made for a description of the method of determining Constraint Index and examples of the Constraint Indices for a number of zeolites. Zeolites of this class are well-known intermediate ore size aluminosilicate zeolites; typical members of this class are the zeolites having the structures of ZSM-5 (U.S. Pat. No. 3,702,886 and U.S. Pat.No. Re. 29,948); ZSM-11 (U.S. Pat. No. 3,709,979); ZSM-12 (U.S. Pat. No. 3,832,449); ZSM-22 (U.S. Pat. No. 4,556,477); ZSM-23 (U.S. Pat. No. 4,076,842); ZSM-35 (U.S. Pat. No. 4,016,245); ZSM-48 (U.S. Pat. No. 4,397,827); ZSM-57 (U.S. Pat. No. 4,046,685); ZSM-58 (U.S. Pat. No. 4,417,780); M-41S (U.S. Pat. No. 5,098,684); and MCM-22 (U.S. Pat. Nos. 4,954,325 and 4,962,256). ZSM-5 is the preferred zeolite for use in the present process. The aluminosilicate forms of these zeolites provide the requisite degree of acidic functionality and for this reason are the preferred compositional forms of the zeolites. Other isostructural forms of the intermediate pore size zeolites containing other metals instead of aluminum such as gallium, boron or iron can also be used.

The zeolite catalyst possesses sufficient acidic functionality to bring about the desired reactions to restore the octane lost in the hydrotreating reaction. The catalyst should have sufficient acid activity to have cracking activity that is sufficient to convert the appropriate portion of the feed, suitably with an alpha value of at least about 10, usually in the range of 20 to 800 and preferably at least about 50 to 200 (values measured prior to addition of the metal component). The alpha value is one measure of the acid activity of a catalyst; it is a measure of the ability of the catalyst to crack normal hexane under prescribed conditions. This test has been widely published and is conventionally used in the petroleum cracking art, and compares the cracking activity of a catalyst under study with the cracking activity, under the same operating and feed conditions, of an amorphous silica-alumina catalyst, which has been arbitrarily designated to have an alpha activity of 1. The alpha value is an approximate indication of the catalytic cracking activity of the catalyst compared to a standard catalyst. The alpha test gives the relative rate constant (rate of normal hexane conversion per volume of catalyst per unit time) of the test catalyst relative to the standard catalyst which is taken as an alpha of 1 (Rate Constant=0.016 sec.$^{-1}$). The alpha test is described in U.S. Pat. No. 3,354,078 and in J. Catalysis, 4, 527 (1965); 6, 278 (1966); and 61,395 (1980), to which reference is made for a description of the test. The experimental conditions of the test used to determine the alpha values referred to in this specification include a constant temperature of 538 C. and a variable flow rate as described in detail in J. Catalysis, 61,395 (1980).

The zeolite component of the dual functional catalyst will usually be composited with a binder or substrate because the particle sizes of the pure zeolite are too small and lead to an excessive pressure drop in a catalyst bed. This binder or substrate, which is preferably used in this service, is suitably any refractory binder material. Examples of these materials are well known and typically include silica, silica-alumina, silica-zirconia, silica-titania, alumina.

In preferred embodiments, the dual functional catalyst contains Group VIB metals, such as cobalt and molybdenum to improve catalyst desulfurization activity and stability as well as to improve product quality. Typically, the cobalt and molybdenum will be in the oxide or the sulfide form; it can readily be converted from the oxide form to the sulfide by conventional pre-sulfiding techniques. A molybdenum content of about 1 to about 10 weight percent, conventionally 5 to 10 weight percent, (as metal) is suitable although higher metal loadings typically up to about 15 weight percent can be used. A cobalt content of about 0.5 to 5 weight percent, conventionally 3 to 4 weight percent (as metal) is suitable.

The molybdenum component can be incorporated into the dual functional catalyst by conventional procedures such as impregnation into an extrudate or by mulling with the zeolite and the binder. When the molybdenum is added in the form of an anionic complex such as molybdate, impregnation or addition to the muller will be appropriate methods.

The particle size and the nature of the catalyst will usually be determined by the type of conversion process which is being carried out with operation in a down-flow, fixed bed process being typical and preferred.

The conditions of operation and the catalysts should be selected based on the characteristics of the feed so that the gasoline product octane is not substantially lower than the octane of the feed gasoline boiling range material; that is, not lower by more than about 1 to 20 octane numbers and usually, not more than 1 to 5 octane numbers, depending on the nature of the feed. It is preferred also that the volume of the product should not be substantially less than that of the feed although yields as low as 80 percent can be achieved with certain feeds under particular conditions. In some cases, the volumetric yield and/or octane of the gasoline boiling range product can be higher than those of the feed, as noted above and in favorable cases, the octane barrels (that is the octane number of the product times the volume of product) of the product will be higher than the octane barrels of the feed.

EXAMPLES

The bromine numbers of the desulfurized gasoline products were measured to determine the change in composition. The bromine number is a method of calculating the contents of an olefin and it is proportional to the olefin content of the gasoline. The bromine number is the number of grams of bromine absorbed by 100 grams of gasoline indicates the percentage of double bonds present. Thus, when the type and molecular weight is known, the contents of the olefin can be calculated.

To demonstrate the present invention, the ratio of the reaction rate constant for bromine number reduction to the reaction rate constant for desulfurization was analyzed. The rate constant for the bromine number reduction was calculated by a first order kinetic equation (Eq. 1), while desulfurization was calculated by a second order kinetic equation (Eq. 2). Kinetically, the bromine number reduction is expressed as follows:

$$k_{Br\#}=Ln(Br\#_P/Br\#_F)* LHSV \qquad (1)$$

where $k_{Br\#}$ is the first order rate constant for the bromine number reduction reaction, LHSV is the hourly liquid space velocity and $Br\#_P$ and $Br\#_F$ are bromine numbers for the product and feed, respectively.

Similarly, the second order desulfurization reaction is expressed as follows:

$$k_{Des}=[(1/C_S)-(1/C_{SO})]* LHSV \qquad (2)$$

where $k_{DeS}$ is the desulfurization rate constant and $C_S$ and $C_{SO}$ are sulfur contents measured as wt % for the product and feed, respectively.

The significance of the kinetic ratio of the reaction rate constant for bromine number reduction to the reaction rate constant for desulfurization (the bromine/desulfurization K ratio) is that it provides an indication of the olefin saturation of the product gasoline in relation to the amount of desulfurization. Olefin saturation is directly related to the octane of gasoline. A high olefin saturation level in the product gasoline means that the gasoline has a high octane and is more valuable. The desulfurization process includes some cracking of hydrocarbons in the gasoline stream and results in a reduction of the olefin saturation. Therefore, there are competing considerations in a desulfurization process, the need to reduce sulfur levels and the need to maintain a high olefin saturation level. The bromine/desulfurization K ratio provides a means for comparing different operating conditions for a gasoline desulfurization process. From the experiments conducted for the present invention (and shown herein below), it has been determined that the preferred operating conditions have a K ratio of less than 0.02 for full range gasolines and less than 0.005 for 90 C– fraction of the full range gasoline, and the most preferred operating conditions have a K ratio of less than 0.01 and 0.002, respectively.

For Examples 1–5, the data were generated using a laboratory prepared CoMo ZSM-5/Al$_2$O$_3$ catalyst that contained ZSM-5 zeolite and alumina in an 80/20 ratio prior to the CoMo addition. The cobalt and molybdenum were added by a two-stage impregnation method. The finished CoMo ZSM-5/Al$_2$O$_3$ contained 2.7 wt % cobalt and 9.6 wt % molybdenum, respectively.

Example 1

In this example, a full-range commercial FCC gasoline (Table 1) was desulfurized at 3 LHSV, 300 psig total pressure, and 2,000 scf/bbl once-through hydrogen circulation rate over the CoMo ZSM-5/Al$_2$O$_3$ catalyst. The kinetic rate constant ratio for bromine number reduction to desulfurization (the K ratio) increased with temperature indicating that operation at low temperatures is preferred, particularly at temperatures less than 600 F. When the process of the present invention is operated at temperatures below 700 F., the K ratio is less than 0.02 and when the process temperature is below 600 F., the K ratio is less than 0.01.

TABLE 1

| FULL-RANGE FCC GASOLINE | |
|---|---|
| Gravity, API | 48 |
| Hydrogen, wt% | 12.42 |
| Sulfur, wt% | 0.28 |
| Bromine Number | 40.61 |
| Research Octane | 90.0 |
| Motor Octane | 78.8 |
| Road Octane | 84.4 |

TABLE 1-continued

| FULL-RANGE FCC GASOLINE | |
|---|---|
| Distillation (D86), C | |
| IBP | 54 |
| 10% | 89 |
| 50% | 140 |
| 90% | 195 |
| EBP | 220 |

Example 2

In this example, the full-range FCC gasoline was desulfurized at 500 psig total pressure. Again, the test results show that operation at low temperature is preferred. The K ratio is less than 0.02 for operating temperatures below 500 F. and the K ratio increases significantly at operating temperatures above 500 F. In addition, a comparison of the test results of Example 1 with the test results of Example 2 shows that at the same operating temperature, the K ratio is lower at 300 psig than it is at 500 psig. Moreover, at the lower operating pressure, the test results do not begin to show a significant increase in K ratio until the temperature is above 700 F.

Example 3

In this example, the 90 C– fraction of the full-range FCC gasoline was desulfurized at 300 psig. This fraction of the FCC gasoline was very olefinic and had a bromine number of 81.44 units (Table 2). FIG. 3 shows that the K ratios for the 90 C– fraction are significantly lower than for the full-range FCC gasoline (approximately one-tenth less) in Examples 1 and 2. However, the test results in FIG. 3 show that the preferred operating temperature is below 700 F. and, preferably below 600 F., which is consistent with the results in FIGS. 1 and 2. At an operating temperature of 700 F., the K ratio is less than 0.006, and at an operating temperature of less than 600 F., the K ratio is less than 0.003.

TABLE 2

| THE 90 C FRACTION FCC GASOLINE | |
|---|---|
| Gravity, API | 74.5 |
| Hydrogen, wt% | 14.55 |
| Sulphur, wt% | 0.049 |
| Bromine Number | 81.44 |
| Research Octane | 94.7 |
| Motor Octane | 76.5 |
| Road Octane | 85.6 |
| Distillation (D2887), C | |
| IBP | –6 |
| 10% | 27 |
| 50% | 64 |
| 90% | 91 |
| EBP | 114 |

Example 4

In this example, the catalyst performance for producing gasoline containing 100 ppmw sulfur was compared for desulfurization activity at 500 F. based on the above rate constant ratios of Examples 1–3. As shown in Table 3, operation at low pressure (300 psig) gives less octane loss. At 300 psig, the octane losses for the full-range FCC gasoline was 3.6 road octane units. In contrast, the octane loss for the full-range FCC gasoline at 500 psig was 8.9 road octane units. Thus, desulfurization at 300 psig instead of 500 psig resulted in an increase of 5.3 road octane units. An even lower octane loss resulted when the 90 C− fraction was desulfurized at 300 psig, that is 2.5 road octane units loss compared to the 3.6 road octane units loss for full-range FCC gasoline at 300 psig.

TABLE 3

SIMULATIONS FOR DESULFURIZATION TO 100 ppmw S

| Feed Properties | Full-Range | | 90C− |
|---|---|---|---|
| Sulfur, wt % | 0.28 | 0.28 | 0.049 |
| Bromine No. | 40.61 | 40.61 | 81.44 |
| $C_5^+$ Yield, vol % | 99.6 | 99.6 | 97.9 |
| Operating Conditions | | | |
| Pressure, psig | 300 | 550 | 300 |
| Temperature, F | 500 | 500 | 500 |
| LHSV | 0.36 | 0.42 | 0.80 |
| Product Quality | | | |
| Sulfur, ppmw | 100 | 100 | 100 |
| Bromine No. | 27.6 | 3.3 | 68.4 |
| Road Octane | 80.8 | 75.5 | 83.1 |
| Octane Loss | 3.6 | 8.9 | 2.5 |
| $C_5^+$ Yields, vol % | 102 | 102.5 | 96.8 |

Example 5

In this example, desulfurization of a heavy FCC gasoline (the characteristics of the gasoline are shown in Table 5) was carried out using a CoMo ZSM-5/$Al_2O_3$ catalyst at 600 F. and 725 F. Any zeolite containing catalysts, such as CoMo ZSM-5/$Al_2O_3$ catalyst, can enhance octane at high temperature. However, the octane enhancement is accompanied by a yield loss. As shown in Table 4, operation at 600 F. resulted in an octane-barrel value of 93.4 compared to operation at 725 F. which resulted in an octane-barrel value of 92.3 for similar residual sulfur levels (i.e., 32 ppmw at 600 F. and 40 ppmw at 725 F.). Thus, in addition to reducing the octane loss, the present invention also preserves gasoline yield, which can be significant at high temperature.

TABLE 4

COMPARISON AT EQUIVALENT DESULFURIZATION

| | Feed | Low Temp | High Temp. |
|---|---|---|---|
| Sulfur, ppmw | 14,200 | 32 | 40 |
| Temperature, F | | 600 | 725 |
| Road Octane | 92.7 | 92.4 | 93.4 |
| $C_5^+$ Yield, vol % | 100 | 101.1 | 98.8 |
| Octane-Barrel | 92.7 | 93.4 | 92.3 |
| Operating Conditions: | | | |

3 LHSV, 600 psig total pressure, and 2,000 scf/bbl hydrogen circulation.
Feed: Heavy FCC Gasoline (Table 5).

TABLE 5

HEAVY FCC GASOLINE

| Gravity, API | 24.8 |
|---|---|
| Hydrogen, wt% | 9.87 |
| Sulfur, wt% | 1.42 |
| Bromine Number | 11.59 |
| Research Octane | 99.0 |
| Motor Octane | 86.4 |
| Road Octane | 92.7 |

TABLE 5-continued

HEAVY FCC GASOLINE

| Distillation (D86), C | |
|---|---|
| IBP | 120 |
| 10% | 180 |
| 50% | 201 |
| 90% | 229 |
| EBP | 252 |

Example 6

In this example, a conventional desulfurization catalyst was used to desulfurize the heavy FCC gasoline shown in Table 5. The heavy FCC gasoline reacted with a commercial CoMo/$Al_2O_3$ catalyst at 3 LHSV and 6 LHSV, 600 psig total pressure, and 2,000 scf/bbl hydrogen circulation rate. The results are summarized in Table 6. The results show that operation at low temperature is preferred since it gives a high octane-barrel value.

TABLE 6

COMPARISON AT EQUIVALENT DESULFURIZATION

| | 3 LHSV | | 6 LHSV | |
|---|---|---|---|---|
| Product Sulfur, ppmw | 42 | 38 | 29 | 27 |
| Temperature, F | 550 | 700 | 650 | 750 |
| Total Pressure; psig | 600 | 600 | 600 | 600 |
| Road Octane | 91.6 | 90 | 91.1 | 90.6 |
| $C_5^+$ yield, vol % | 102.4 | 102.2 | 102.0 | 101.8 |
| Octane-Barrel | 93.7 | 92.0 | 92.9 | 92.2 |

At 3 LHSV, a product gasoline containing 42 ppmw and having a 93.7 octane-barrel value was produced at 550 F., compared to a product gasoline containing 38 ppmw and having a 92.0 octane-barrel value produced at 700 F. Thus, at similar residual sulfur levels, gasoline desulfurized at 550 F. had an octane-barrel value that was 1.7 higher than gasoline desulfurized at 700 F. Similar results were achieved at 6 LHSV, where a product gasoline containing 29 ppmw and having a 92.9 octane-barrel value was produced at 650 F., compared to a product gasoline containing 27 ppmw and having a 92.2 octane-barrel value produced at 750 F. In this case, for the lower temperature operation the octane-barrel value that was 0.7 higher.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

What is claimed is:

1. A process for reducing sulfur content of gasoline while substantially maintaining motor octane number and road octane number, comprising:

contacting a catalytically cracked olefinic gasoline stream comprising organic sulfur compounds and having an initial boiling point in the gasoline boiling range, an initial sulfur content and an initial road octane number with a catalyst comprising an alumina substrate impregnated with at least one metal selected from the group consisting of Group VI metals of the Periodic Table and Group VIII metals of the Periodic Table, under a combination of a temperature of from about 300 F. to about 650 F., a space velocity of from about 0.1 to 10 LHSV and an atmosphere comprising hydrogen to convert said sulfur compounds to hydrogen sulfide;

wherein hydrogen sulfide is removed from said gasoline stream to provide a gasoline having a reduced sulfur content lower than said initial sulfur content, a less than 5% change in motor octane number from said initial motor octane number and a less than 10% change in said research octane number.

2. A process according to claim 1, wherein said catalyst is a dual functional catalyst and further comprises an intermediate pore size zeolite selected from the group consisting of ZSM-5, ZSM-11, ZSM-22, ZSM-12, ZSM-23, ZSM-35, ZSM-48, ZSM-57, ZSM-58, M-41S and MCM-22.

3. A process according to claim 2, wherein said intermediate pore size zeolite is impregnated with cobalt and molybdenum.

4. A process according to claim 3, wherein said impregnated catalyst comprises from about 0.5% to 10% by weight cobalt and from about 1% to 20% by weight molybdenum.

5. A process according to claim 4, wherein said space velocity is from about 0.5 to 5 LHSV.

6. A process according to claim 4, further comprising a hydrogen to hydrocarbon ratio of about 100 to 5,000 standard cubic feet of hydrogen per barrel of hydrocarbon.

7. A process according to claim 1, further comprising a hydrogen to hydrocarbon ratio of about 1,500 to 3,500 standard cubic feet of hydrogen per barrel of hydrocarbon.

8. A process according to claim 4, wherein said process is carried out within a pressure range of from about 300 psig to about 600 psig.

9. A process according to claim 1, wherein said reduced sulfur content of said recovered gasoline stream is from about 5% to about 10% of said initial sulfur content.

10. A process according to claim 4, wherein said reduced sulfur content of said recovered gasoline stream is from about 5% to about 10% of said initial sulfur content.

* * * * *